(12) United States Patent
Asami

(10) Patent No.: US 6,371,533 B1
(45) Date of Patent: Apr. 16, 2002

(54) POP-UP MECHANISM

(75) Inventor: Goro Asami, Tokyo (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/549,671

(22) Filed: Apr. 14, 2000

(30) Foreign Application Priority Data

Apr. 30, 1999 (JP) ............................................ 11-123930

(51) Int. Cl.⁷ .............................. E05C 19/00; B68G 5/00
(52) U.S. Cl. ............................. 292/1; 292/275; 248/118
(58) Field of Search ............................ 292/1, 95, 109, 292/118, 262, 278, 275, DIG. 4, DIG. 5, DIG. 11, DIG. 43; 248/118

(56) References Cited

U.S. PATENT DOCUMENTS

| | | | |
|---|---|---|---|
| 4,810,087 A | * | 3/1989 | Tachibana et al. ............. 353/79 |
| 5,722,703 A | * | 3/1998 | Iwamoto et al. ................ 292/1 |
| 5,999,364 A | * | 12/1999 | Aoki et al. .................. 360/96.6 |

FOREIGN PATENT DOCUMENTS

| JP | 5-340459 | 12/1993 |
|---|---|---|
| JP | 2542005 | 4/1997 |

\* cited by examiner

*Primary Examiner*—Christopher P. Schwartz
*Assistant Examiner*—Thomas J. Williams
(74) *Attorney, Agent, or Firm*—Kaensaka & Takeuchi

(57) ABSTRACT

A pop-up mechanism is formed of a base body, at least one pair of flip-flop members, each being rotatably linked to the base body at one end, and an ascending and descending member rotatably attached to the flip-flop members at the other ends. The flip-flop members have a folded state where the flip-flop members are substantially located close to the base body, and a pop-up state where the flip-flop members are turned upwardly. An urging member is attached to at least one of the flip-flop members for urging the one flip-flop member in the pop-up state, and a locking device is formed for locking the flip-flop members in the folded state. In the pop-up mechanism, at least one strut with a predetermined height is placed on an upper surface of the base body and/or a lower surface of the ascending and descending body. In the pop-up state, a tip of the strut abuts against a portion communicating with the upper surface of the base body and/or the lower surface of the ascending and descending body to hold the ascending and descending body in the pop-up state.

10 Claims, 14 Drawing Sheets

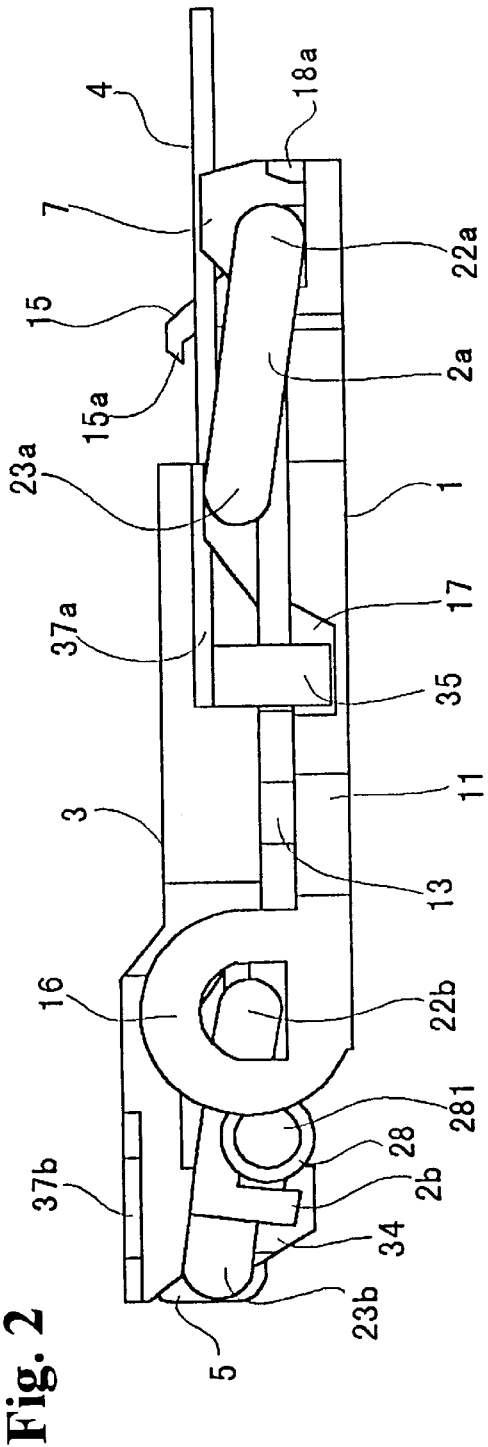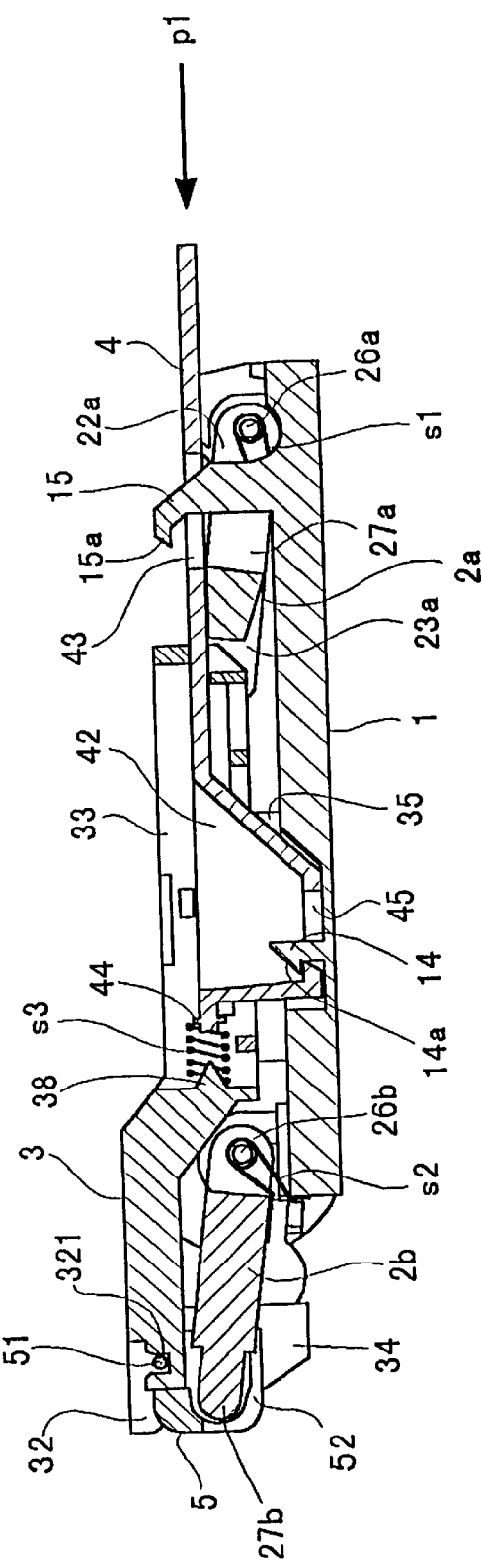

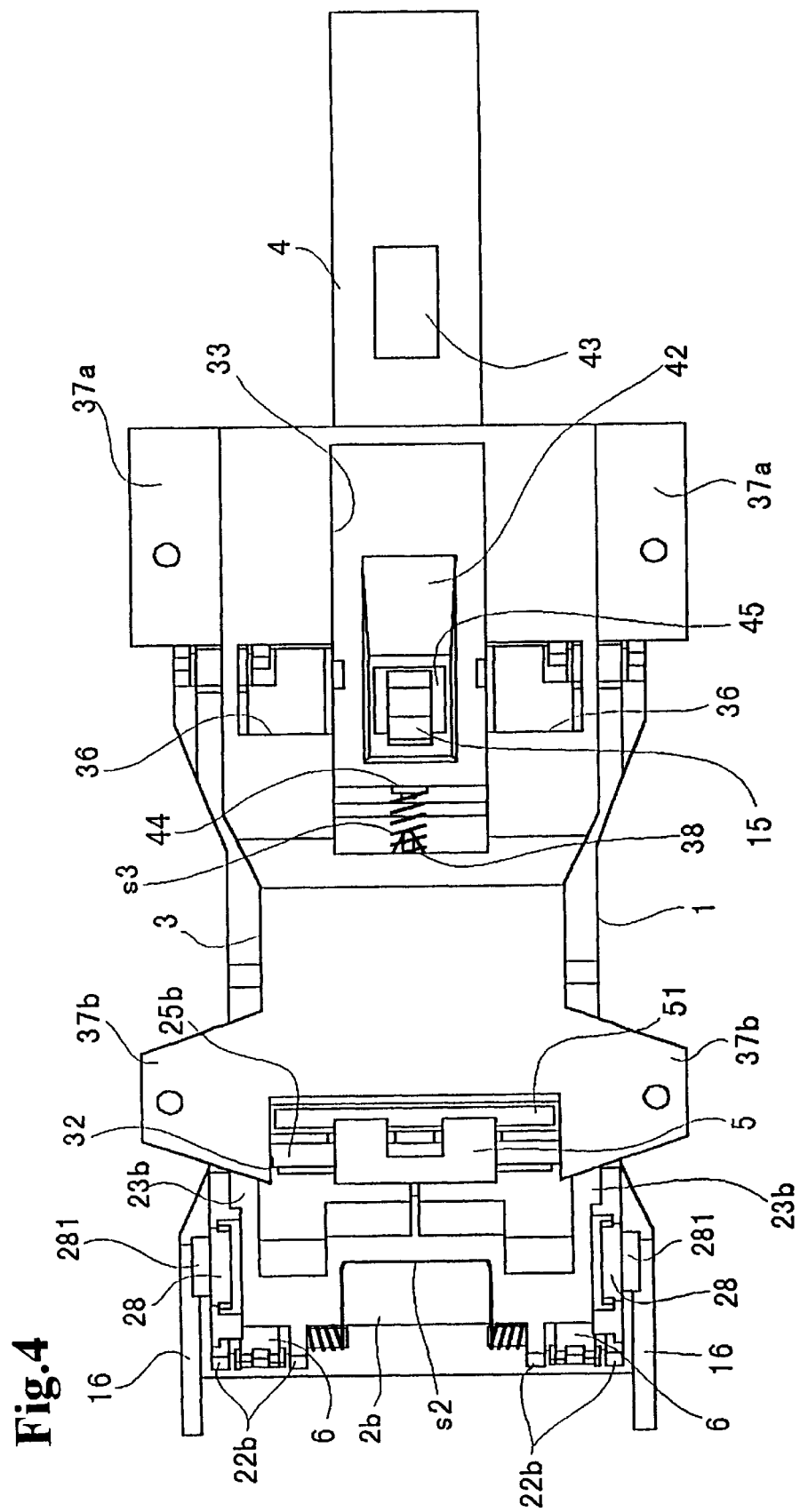

POP-UP MECHANISM

BACKGROUND OF THE INVENTION AND RELATED ART STATEMENT

The present invention relates to a pop-up mechanism that is well-suitably used as a height-adjusting mechanism of an arm rest, and the like, which is incorporated in an arm rest constructed on a center console box of an automobile or an arm rest furnished in a rear seat. More specifically, it relates to a pop-up mechanism in which an ascending and descending body is attached to be capable of rotation to at least a pair of flip-flop members at front and back provided to be able to rotate on a base body to thereby constitute a link mechanism, and the above flip-flop members are rotated to raise and lower the above ascending and descending body.

From the past, it has been a practice to provide a center console box (a), such as shown in FIG. 13, between the driver and front passenger seats, and the like. Most recently, it has been a practice to use a center console box (a) as an arm rest by providing on the cover (b) of this center console box (a) an ascending and descending body (not illustrated in FIG. 13) that is raised and lowered by a button operation, attaching an arm rest (e) to this ascending and descending body, and raising this arm rest (e) using the above ascending and descending body.

In such a console box operating as an arm rest, as a pop-up mechanism that raises and lowers the above ascending and descending body, there is a mechanism in the past shown in FIGS. 14–16. That is, this pop-up mechanism constitutes a link mechanism with a cover (b) of the console box (a) as a base body, flip-flop or collapsible members (c, d) attached at a specified distance away from each other on that cover (b) so as to be capable of flipping up and down, and ascending and descending body (f) with the arm rest (e) linked on the upper ends of these flip-flop members (c, d) so as to be capable of rotation. Torsion springs (h) are disposed between the above two flip-flop members (c, d) and the base parts (g) of the flip-flop members (c, d) fixed to the cover (b) so as to force both flip-flop members (c,d) in the upright direction. Also, a long plate-shaped lock piece (i) for locking in the folded state with the flip-flop members (c, d) turned down (state in FIG. 14) and in the pop-up state with flip-flop members (c, d) standing upright (state in FIG. 15) is attached to the above ascending and descending body (f) so as to be capable of sliding forward and backward (to the left and right in the drawing). The lock piece is urged forward by a coil spring (j).

This pop-up mechanism, when folded with both flip-flop members (c, d) turned down on the cover (b) in opposition to the force of the above torsion springs (h) as shown in FIG. 14, is locked in the folded state in opposition to the force of the above torsion springs (h) with a hook-shaped tip of a lock stud (k) projecting on the upper surface of cover (b) coupling with a lock hole (m) formed on the above lock piece (i). At this time, the above lock piece (i) becomes in a state where it is positioned at the limit of the forward (right side in the drawing) movement by the force of the above coil spring (j), and a lock nub or projection (n) sticking out on the front end is inserted into a somewhat rectangular fan-shaped push-in cavity (o) formed on the tip of the forward flip-flop member (c).

When the arm rest (e) is used by raising the ascending and descending body (f) from this state, a lock release (s) extending integrally from the front end of the above lock piece (i) and protruding from the front end of the above arm rest (e) is pressed (p1). Thus, as shown in FIG. 16(A), the above lock piece (i) slides backward (left side in the drawing), and the coupling state of the edge of the above lock hole (m) provided on that lock piece (i) with the above lock stud (k) is released, so that the locked state is released. By this, both flip-flop members (c, d) are rotated toward the upright direction by the force of torsion springs (h), and the ascending and descending body (f) is raised by the operation of the link mechanism. As shown in FIG. 16(B), by releasing the above pressing force (p1), the lock nub (n) of the lock piece (i) having been moved forward (right side in the drawing) by the force of the above coil spring (j) is pressed backward inside the push-in cavity (o) by the rotational movement of the flip-flop member (c), and again the lock piece (i) slides backward. Also, at the point when the flip-flop member (c) was rotated to the upright state, it comes to a state where the above lock nub (n) is aligned with a check cavity (r) formed inside the upper part of the flip-flop member (c), and as shown in FIG. 15, the lock piece (i) again is moved forward (right side in the drawing) by the force of the coil spring (j), and the lock nub (n) is inserted into the check cavity (r) such that the two are coupled. Thus, it is locked in the pop-up state with both flip-flop members (c, d) standing upright.

Furthermore, when the ascending and descending body (f) is lowered from this pop-up state and is returned to the folded-up state in FIG. 14, again, the lock release (s) is pressed (p2) such that the above lock piece (i) is slid backward (left side in the drawing) as shown in FIG. 16(C). By this, the above lock nub (n) provided on that lock piece (i) comes out from the check cavity (r) of the flip-flop member (c), and the locked state is released. The above ascending and descending body (f) is pressed downward in this state while both flip-flop members (c, d) are rotated backward by the operation of the link mechanism. As shown in FIG. 16(D), by the release of the above pressing force (p2), the tip of the above lock stud (k) is made to meet with a tapered part formed on the lower side of the back edge of the lock hole (m) of the lock piece (i) which had been moved to the limit of the forward movement (right side in the drawing). In this state, the ascending and descending body (f) is further pressed (p3) so as to be pushed down, whereby the lock piece (i) is slid backward by the operation of the above tapered part and the lock stud (k) is inserted into the lock hole (m), upon which the lock piece (i) again is slid forward by the force of the coil spring (j), and as shown in FIG. 14, the lock stud (k) and lock hole (m) are coupled, and they are locked in the folded state.

Thus, with this pop-up mechanism, the arm rest (e) attached to the cover (b) of the center console box (a) can be used well in an automobile by pressing the lock release (s) to cause the ascending and descending body (f) to rise, and after use, it can be folded by pressing the lock release (s) to release the locked state and pressing the ascending and descending body (f) down.

However, because this convention pop-up mechanism was constituted such that all the load on the ascending and descending body (f) is supported by the above flip-flop members (c, d), during the pop-up state when used as an arm rest, it is necessary that the above flip-flop members (c, d) be put into a vertical state which is most superior in load-bearing capability. Because of this, there is a drawback that the range of raising of the ascending and descending body (f) and the range of the forward-backward distance during the pop-up state are necessarily linked, and these can not be set separately.

That is, there are various positions and heights of the center console boxes of automobiles according to the vehicle type, and in order to use the cover of this center console box comfortably as an arm rest, it is necessary to set the range of raising and the range of forward-backward movement in the pop-up state to the optimum ranges according to the vehicle type. There are cases according to the vehicle type such that it is sought to make the range of raising greater and the range of forward-backward movement smaller, and conversely it is sought to make the range of raising smaller and range of forward-backward movement greater.

However, with the above pop-up mechanism in the past, because it is necessary to make the flip-flop members (c, d) stand up vertically during the pop-up state from the view point of load-bearing capability as described above, the range of raising of the ascending and descending body (f) becomes the distance between the points of support of the flip-flop members (c, d). Also, because the flip-flop members (c, d) become in a state to be turned down somewhat horizontally on the base body (b) when folded, the range of forward-backward movement of the ascending and descending body (f) becomes the distance between the points of support of the flip-flop members (c, d). Thus, the range of raising and the range of forward-backward movement become roughly the same distance. Because of this, it is not possible to set separately the range of raising and the range of forward-backward movement of the ascending and descending body (f), and it is not possible to set the optimum pop-up operation according to the vehicle type.

Also, because it is constituted such that the load is supported by the above flip-flop members (c, d), in order to withstand that load, a metal shaft must be used as a rotation shaft linking the above flip-flop members (c, d) and base (b) as well as the ascending and descending body (f) so as to be capable of rotation. This becomes a factor that prevents reduction of weight and causes the increase of cost and complication of the assembly operation, and the like.

Furthermore, because it is made such that the load is supported by the flip-flop members (c, d) in the state of standing up vertically, there is also a drawback that a great force may be expended in the direction of rotating the flip-flop members (c, d) according to the direction of the load, and because of this, a great load is applied to the parts of the lock mechanism, such as lock nub (n) and check cavity (r), which is used in the state where the flip-flop members (c, d) are standing up vertically. Thus, these parts of the lock mechanism tend to be damaged. In order to eliminate these drawbacks in the pop-up mechanism of the past, it is necessary to provide a more sturdy locking means in place of the lock nub (n) and the check cavity (r), and in this case, it further prevents the reduction of weight and increases the cost and complication of the assembly operation.

The present invention has been made in consideration of the above situation, and an object of the invention is to provide a pop-up mechanism using a link mechanism, wherein the range of raising and range of forward-backward movement of the ascending and descending body can be set separately, and it is possible to design for reduction of weight, curtailment of cost, and improvement of assembly operation.

Further objects and advantages of the invention will be apparent from the following description of the invention.

SUMMARY OF THE INVENTION

In order to achieve the above object, the present invention provides a pop-up mechanism having a base body, at least one pair of flip-flop members at front and back, each one end linked to the upper surface of the base body so as to be capable of rotation, an ascending and descending member attached to the other ends of the flip-flop members so as to be capable of rotation, forcing or urging means for forcing the above flip-flop members in one rotational direction, and locking means for locking in a state where the above flip-flop members are turned down on the above base body. In a pop-up state, the above ascending and descending body is raised to a specified height from the above base body from a folded state where the above flip-flop members are turned down on the above base body in opposition to the force of the above forcing means and are locked by the above locking means. In the locked state by releasing the above locking means, the above flip-flop members are rotated for a specified angular degree by the force of the above forcing means and the above ascending and descending body is raised. The rotation of the flip-flop members by the force of the forcing means is checked or prevented in a state where the flip-flop members are rotated to a specified angular degree, and the ascending and descending body is raised to a specified position. It is held in the folded state where the above flip-flop members are turned down on the above base body from this pop-up state, by rotating the above flip-flop members in opposition to the force of the above forcing means and turning down on the above base body to be locked in this state by the above locking means.

In the pop-up mechanism, a strut having a specified height is placed to project on the upper surface of the above base body or on the lower surface of the above ascending and descending body or on both of these. During the above pop-up state, the tip of the strut on the upper surface of the base body meets the lower surface of the ascending and descending body, or the tip of the strut on the lower surface of the ascending and descending body meets the upper surface of the base body, or the tips of both struts placed on the upper surface of the base body and the lower surface of the ascending and descending body meet. Thus, the one or more of the strut supports the above ascending and descending body in the pop-up state.

In the pop-up mechanism of the present invention, the flip-flop members provided so as to be capable of rotation on the above base body are rotated by the force of the above forcing means from a state where they are turned down on the base body, the ascending and descending body attached to the other ends of those flip-flop members is raised by the link mechanism, and the flip-flop members are rotated to a specified angular degree. Thus, the ascending and descending body is raised to a specified position, in which state the strut provided on the base body or the ascending and descending body, or on both, meets the ascending and descending body or the base body, or the struts meet each other. Thus, the rotation of the flip-flop members is checked or prevented in opposition to the force of the above forcing means, and the ascending and descending body is raised to a specified position, and it is held in such a pop-up state.

Accordingly, the angular degree of rotation of the flip-flop members in the pop-up state can be set arbitrarily by arbitrarily setting the height of the above strut, whereby the range of raising and the range of forward-backward movement of the ascending and descending body can be set separately. Moreover, because the load on the ascending and descending body is supported by the above strut which is fixed to the base body or ascending and descending body and can be made completely rigid, it is more superior also in the load bearing capability than the pop-up mechanism of the past where the load was supported by the flip-flop members provided so as to be capable of rotation between the base body and the ascending and descending body. Accordingly, with the pop-up mechanism of the present invention, when used as a pop-up mechanism of an arm rest constituted on the cover of a center console box of an automobile, and the like, the arm rest can be raised and lowered such that the optimum pop-up state is obtained by separately setting the range of raising and the range of forward-backward movement according to the vehicle type.

Also, as noted above, because the load on the ascending and descending body is supported by the above strut and the load on the ascending and descending body is not laid on the flip-flop members, great strength is not required for the rotation shaft linking the flip-flop members and the base body as well as the ascending and descending body. Thus, such rotation shaft can be formed integrally with the flip-flop members using comparatively light-weight synthetic resin, and reduction of weight, curtailment of cost, and improvement of assembly operation can be designed more as compared with the pop-up mechanism of the past where it was necessary to use a metal shaft as the rotation shaft.

Furthermore, because the load on the ascending and descending body is supported by the above strut, there is no great load on the lock mechanism holding the pop-up state, and it is sufficient for the lock mechanism holding the pop-up state to be simple. Also, because the rotation of the flip-flop members due to the force of above forcing means is checked by making the strut meet the base body or the ascending and descending body or by making the struts meet each other such that the pop-up state is maintained, it is possible to maintain a good pop-up state by the force of the forcing means. In some cases, the lock mechanism for maintaining the pop-up state also can be omitted. Accordingly, from this point as well, it is possible to design for reduction of weight, curtailment of cost, and improvement of assembly operation.

BRIEF DESCRIPTION OF THE DRAWINGS

FIG. 2 is a side view showing the same pop-up unit when folded;

FIG. 3 is a sectional view showing the same pop-up unit when folded;

FIG. 4 is a plan view showing the same pop-up unit when popped up;

FIGS. 8(A)–8(C) are enlarged sectional views showing a lock part of the same pop-up unit when folded, wherein FIG. 8(A) is when it is locked, FIG. 8(B) is when the lock is released, and FIG. 8(C) is a state immediately before locking when it has moved from the pop-up state to the folded state;

FIGS. 9(A)–9C) are enlarged sectional views showing the lock part of the same pop-up unit when popped up, wherein FIG. 9(A) is a state immediately before locking, FIG. 9(B) is when it is locked, and FIG. 9(C) is when the lock is released;

FIGS. 10(A)–10(C) are schematic drawings for sequentially explaining the pop-up operation of the same pop-up unit, wherein FIG. 10(A) is when it is folded, FIG. 10(B) is when an ascending and descending body reaches the highest point, and FIG. 10(C) is when it is popped up;

FIGS. 12(A)–12(C) are schematic drawings showing another example of a strut constituting a pop-up mechanism of the present invention, wherein FIG. 12(A) is the folded state, FIG. 12(B) is while rotating, and FIG. 12(C) is the upright state;

DETAILED DESCRIPTION OF PREFERRED EMBODIMENTS

Hereinbelow, embodiments are shown, and the present invention is explained more specifically.

FIGS. 1–7 show a pop-up unit operating by a pop-up mechanism pertaining to one embodiment of the present invention. This pop-up unit is incorporated between a cover (b) of a center console box and an arm rest (e) provided on the cover (b) shown in FIG. 13, and it has a base body 1 fixed to the above cover (b), a pair of flip-flop or collapsible members 2a, 2b attached at front and back on this base body 1 so as to be capable of rotation, and an ascending and descending body 3 linked on the upper ends of these flip-flop members 2a, 2b so as to rotate freely with the above arm rest (e) attached.

Figure 7:
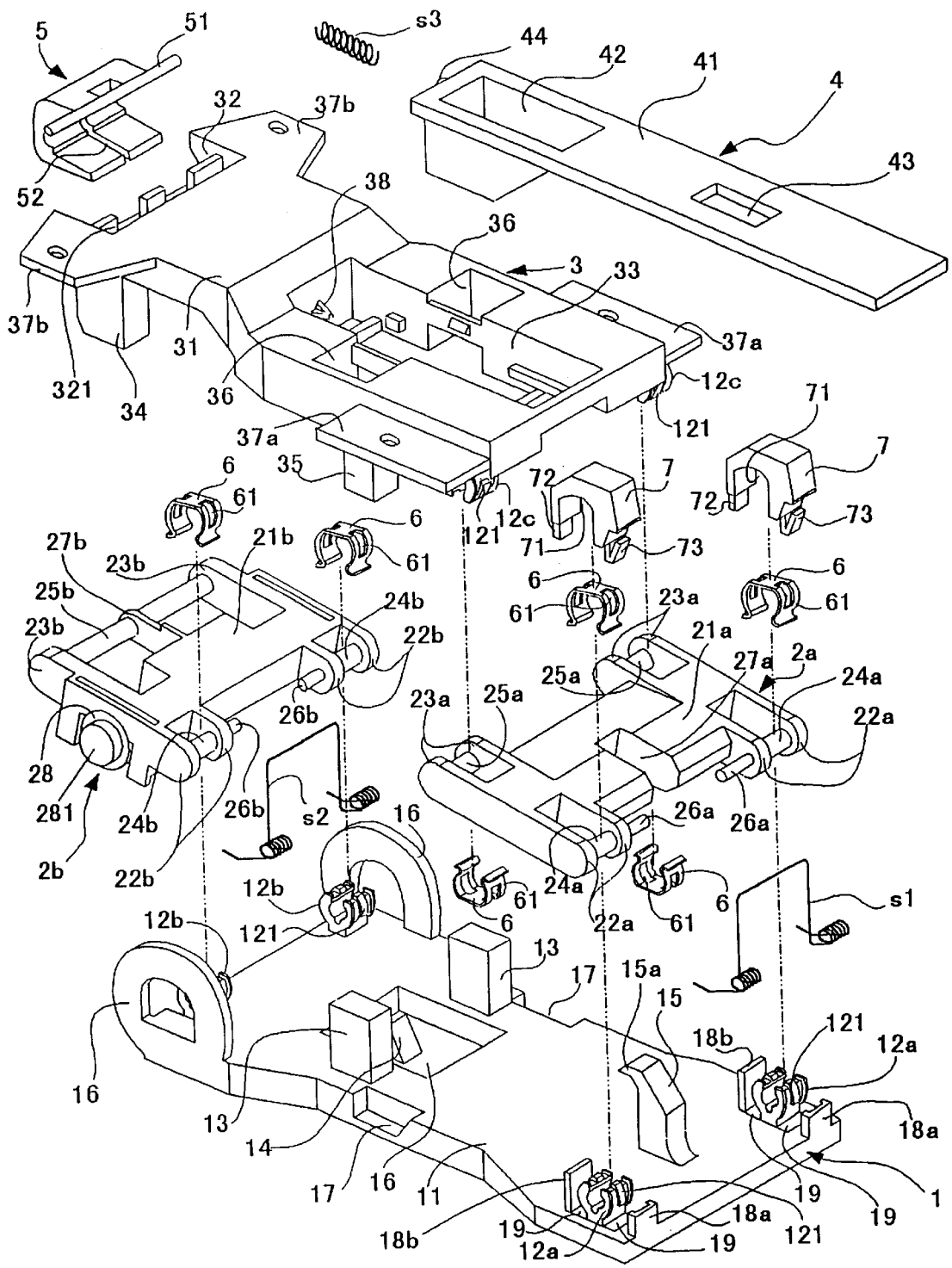
FIG. 7 is an exploded perspective view showing the same pop-up unit.

The above base body 1, as shown in FIG. 7, has four shaft holders 12a, 12a, 12b, 12b, two struts 13, two lock studs 14, 15, and two rack gears 16 placed on an upper surface of a somewhat plate-shaped base 11 to project upwardly.

The above shaft holders 12a, 12a, 12b, 12b are placed to project upwardly by way of platform parts with cut-out opening parts of the somewhat C-shaped holder bodies facing upward, and they are provided respectively on the four corners of base 11. Also, the above struts 13 are square pillar-shaped items placed to project respectively on both sides of the center part in the forward-backward direction (longitudinal direction) of the upper surface of the base 11.

Figure 6:
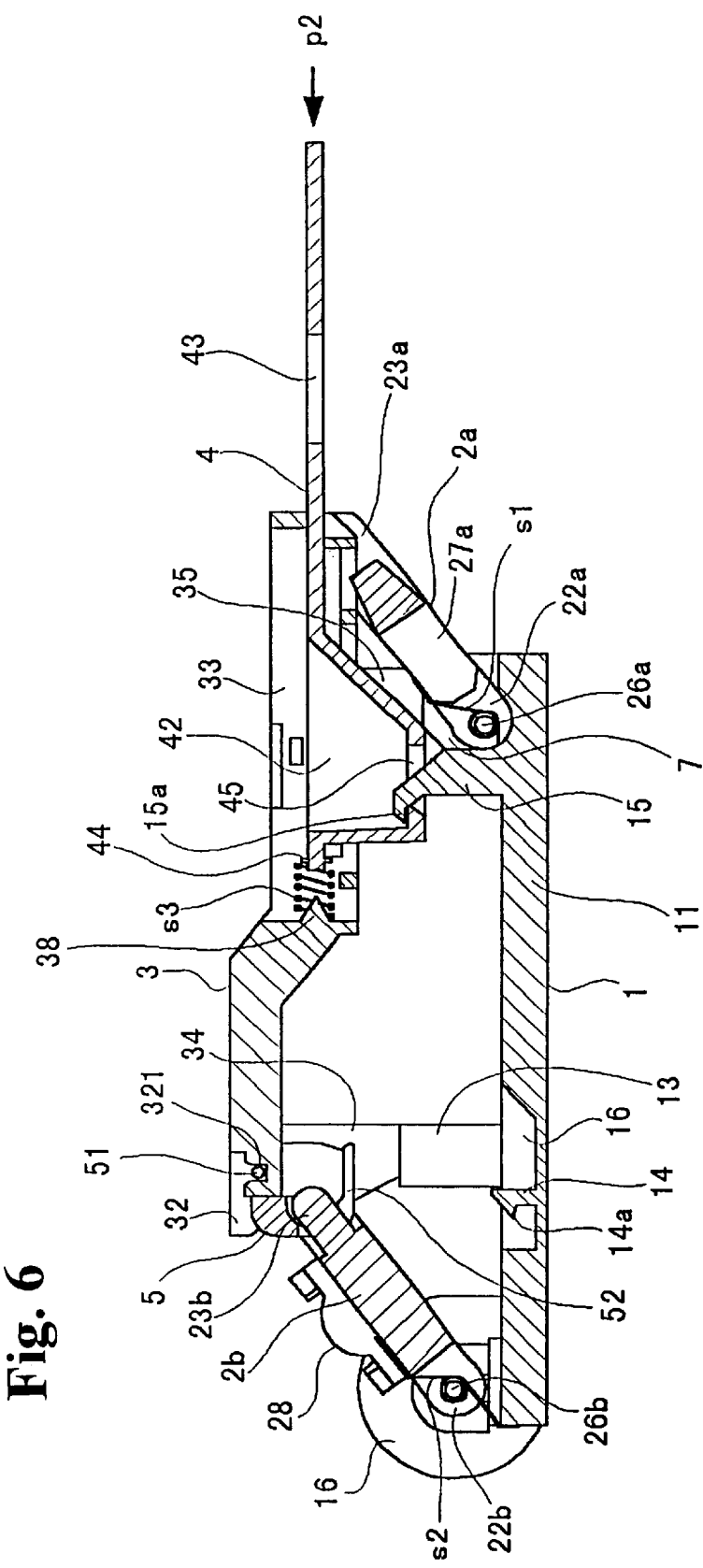
FIG. 6 is a sectional view showing the same pop-up unit when popped up.

The above lock studs 14, 15 both have on their tips hook-shaped lock claws 14a, 15a for coupling with a lock piece 4 attached to the ascending and descending body 3 (refer to FIGS. 3 and 6). Also, the lock stud 14 is a first lock stud for maintaining the folded state of this pop-up unit, and it is placed to project upward inside a cavity 16 provided in the center part in the forward-backward direction and in the center in the width direction of the base 11. Also, the lock stud 15 is a second lock stud for maintaining the pop-up state of this pop-up unit. This second lock stud 15 is placed to project upward in the center in the width direction of the front end part of base the 11, and this second lock stud 15 is formed higher than the above first lock stud 14.

Also, the above rack gears 16 are somewhat washer-shaped flat bodies respectively placed upright on the edges on both sides of the rear end part of the base 11. Each rack gear 16 has on its outer peripheral edge a gear (not illustrated) for engaging a pinion gear 281 of an oil damper 28 to be discussed later.

Furthermore, as shown in FIG. 7, on the edges on both sides in the center part of the forward-backward direction on the upper surface of the base 11 of this base body 1, there are formed recessed parts 17 to be inserted into by struts 35 provided on the ascending and descending body 3 when folded (refer to FIG. 2). On both sides of the front end part, there are placed small wall bodies 18a, 18b to project upward so as to sandwich the above shaft holders 12a respectively from the front and back. Furthermore, on the base 11 between these small wall bodies 18a, 18b and the holders 12a, there are provided check holes 19 to be coupled with by an insertion stud 72 and a check claw 73 of a strut member 7 to be discussed later.

Next, the above flip-flop unit 2a constituting the pop-up unit of this example is a front flip-flop linking the front end part of the above base body 1 and the front end part of the ascending and descending body 3. As shown in FIG. 7, it has bracket-shaped projecting bodies 22a, 23a, each consisting of a pair of projecting pieces placed to project outward integrally on both sides of both up and down ends of a somewhat thick plate-shaped main body 21a. Between the pairs of the projecting pieces constituting the respective projecting bodies 22a, 23a, there are provided rotation shafts 24a, 25a to straddle integrally between the pair, respectively. Also, from the inner projecting pieces constituting the projecting bodies 22a on the bottom side, there are integrally formed spring attaching shafts 26a respectively to project inwardly to face each other. Furthermore, in the center in the width direction on the bottom side of the above somewhat thick plate-shaped main body 21a constituting this front flip-flop member 2a, there is formed a slit-shaped stab groove 27a extending to the center part in the upward-downward direction, and as shown in FIG. 3, it is made such that the second lock stud 15 of the above base body 1 is inserted into this stab groove 27a when folded.

Also, the above flip-flop member 2b is a rear flip-flop member linking the rear end of the above base body 1 and the rear end of the ascending and descending body 3. As shown in FIG. 7, it has bracket-shaped projecting bodies 22b, each consisting of a pair of projecting pieces placed integrally on both sides of the lower end of a somewhat thick plate-shaped main body 21b, and thick projecting pieces 23b placed respectively from the edges of both sides of the upper end. Between each pair of the projecting pieces constituting the above projecting bodies 22b, there is provided integrally a rotation shaft 24b to straddle therebetween, respectively, and between the above thick projecting pieces 23b as well, there is placed a rotation shaft 25b to straddle therebetween. Also, from the inner projecting pieces constituting the above projecting bodies 22b, there are provided integrally spring attaching shafts 26b respectively to project inwardly to face each other. Furthermore, in the center in the width direction on the upper side of the above somewhat thick plate-shaped main body 21b constituting this rear flip-flop member 2b, there is placed a thick plate-shaped central projecting piece 27b to integrally project outwardly, and the tip of this central projecting piece 27b is integrally formed with the above rotation shaft 25b. Furthermore again, on both sides of the above somewhat thick plate-shaped main body 21b, there are attached oil dampers 28 each having a pinion gear 281.

The above two front and back flip-flop members 2a, 2b are attached so as to be capable of rotation by their respective lower end parts to the front and back end parts of the above base body 1. That is, as shown in FIG. 7, the rotation shafts 24a, 24b provided on the lower end parts of the two flip-flop members 2a, 2b are inserted into the above shaft holders 12a, 12b provided on the upper surface of both front and back ends of the base body 1, and somewhat Omega-shaped metal clips 6 are attached so as to cover the shaft holders 12a, 12b. Then, the hollow part of each shaft holder 12a, 12b inserted into by each rotation shaft 24a, 24b is closed, whereby the two flip-flop members 2a, 2b are attached to both front and back ends of the base body 1 so as to be capable of rotation. In this case, the above metal clips 6 are fixed firmly to the shaft holders 12a, 12b by check holes 61 provided on both side walls and coupled with check studs 121 placed to project outward on the outer peripheral surfaces of the shaft holders 12a, 12b. Also, torsion springs s1, s2 are attached to the spring attaching shafts 26a, 26b of the above two flip-flop members 2a, 2b, and the flip-flop members 2a, 2b are forced to rotate forward by these torsion springs s1, s2.

Here, on the outer peripheries of the front shaft holders 12a linked by the rotation shafts 24a of the front flip-flop member 2a, there are fixed strut members 7 so as to cover those shaft holders 12a from above the metal clips 6, and struts are formed on the upper surfaces on both sides of the front end of the base body 1 by these strut members 7. That is, as shown in FIG. 7, the above strut member 7 is a somewhat trapezoidal block-shaped member having a U-shaped hollow part 71 opened on the lower end. The strut member 7 is put so as to cover the shaft holder 12a from above the metal clip 6, and it is fixed on the base body 1 by inserting and coupling a stud 72 and a check claw 73 provided respectively on the two sides of the lower end into the above check holes 19 of the base body 1. Thus, the trapezoidal block-shaped struts are formed on the upper surface of both sides on the front end of the base body 1 by these strut members 7 (hereinafter, these strut members 7 are simply called struts 7).

Next, the above ascending and descending body 3, as shown in FIG. 7, has a bearing cavity 32 in which is inserted a rotation shaft 25b of the above rear flip-flop member 2b formed on the rear end part of a thick plate-shaped base 31, and in the center part in the width direction, it has a space part 33 that penetrates both the upper and lower surfaces thereof from the center part in the forward-backward direction to the front end. On both sides of the rear end and on the end somewhat forward of the center part in the forward-backward direction on the lower surface of the above base 31, there are respectively placed square pillar-shaped struts 34, 35 to project outwardly (although only struts 34, 35 on one side are shown in FIG. 7, the same struts are placed on the other side as well). On both sides of the front end on the lower surface of the base 31, there are provided integrally shaft holders 12c respectively, which are the same as the shaft holders 12a, 12b provided on the base body 1. Also, on both sides of the center part in the forward-backward direction of the above base 31, there are formed on both sides sandwiching the above space part 33 square holes 36 in which the struts 13 provided on the above base body 1 are inserted when folded (refer to FIG. 1), and on both front and back ends on both sides of the base 31, there are formed attaching pieces 37a, 37b having screw holes to extend outward like wings.

In the above space part 33 of this ascending and descending body 3, there is attached a long plate-shaped lock piece 4 so as to be capable of sliding in the forward-backward direction. That is, the lock piece 4, as shown in FIG. 7, has a sack-shaped cavity 42 swelling out from the lower surface on the back end of a thin long plate-shaped base 41, and on the side somewhat forward from the center part in the forward-backward direction (longitudinal direction) a square stab hole 43 in which the second lock stud 15 placed to project outward on the above base body 1 is inserted when folded. As shown in FIGS. 3 and 6, the lock piece 4 is attached so as to be capable of sliding in the forward-backward direction inside the space part 33 in a state where the above sack-shaped cavity 42 is inserted into the above space part 33 of the above ascending and descending body 3, and the front end side from the center part projects forward from the front end surface of the ascending and descending body 3.

Also, as shown in FIGS. 3 and 6, on the rear end surface of this lock piece 4, there is placed a spring-bearing nub 44 to project outward. A coil spring s3 is disposed between this spring-bearing nub 44 and a spring-bearing nub 38 provided on the space part 33 of the ascending and descending body 3, and the lock piece 4 is forced forward by this coil spring s3. Also, on the side wall of the above sack-shaped cavity 42 of this lock piece 4, there is formed a lock hole 45 to couple with the lock claws 14a, 15a of the first and second lock studs 14, 15 provided on the above base body 1.

The above ascending and descending body 3 is linked by its front end part and rear and part, respectively, so as to be capable of rotation on the upper end parts of the flip-flop members 2a, 2b attached so as to be capable of rotation on the above base body 1. That is, the upper end part of the front flip-flop member 2a has the rotation shafts 25a respectively inserted into the above shaft holders 12c of the ascending and descending body 3, and the metal clips 6 respectively are fixed to those shaft holders 12c in the same manner as its lower end part, whereby it is linked with the front end part of the ascending and descending body 3 so as to be capable of rotation.

Meanwhile, the rear flip-flop member 2b has the rotation shaft 25b at the upper end part to be inserted into the above bearing cavity 32 of the ascending and descending body 3, and a shaft-holding clip 5 is put from above this rotation shaft 25b so as to be fixed inside the bearing cavity 32, whereby it is linked with the ascending and descending body 3 rotatably. That is, the above shaft-holding clip 5 is a somewhat C-shaped molded body of synthetic resin, and as shown in FIG. 7, it has a round bar-shaped pinion bar 51 formed integrally on the edge part of its upper end following that edge part, and a slit 52 formed in the center part in the width direction of a wall part on the lower side. Also, as shown in FIGS. 3 and 6, this shaft-holding clip 5 is put from above the rotation shaft 25b (refer to FIG. 7) of the rear flip-flop member 2b inserted into the bearing cavity 32 of the ascending and descending body 3, and the above pinion bar 51 is placed into a pinion groove 321 formed inside the bearing cavity 32. Then, the wall portion of the lower side is pushed toward the lower side of the ascending and descending body 3. Thus, this shaft-holding clip 5 is fixed to the rear end part of the ascending and descending body 3, and the rotation shaft 25b formed on the upper end part of the rear flip-flop member 2b and the bearing cavity 32 provided on the rear end part of the ascending and descending body 3 are linked so as to be capable of rotation.

All of the above members are formed of synthetic resin except for the springs s1–s3 and the metal clips 6. Also, bulk-removing processing is applied to all of the above members for reduction of weight and conservation of materials, but these bulk-removed parts are omitted in the drawings.

Figure 13:
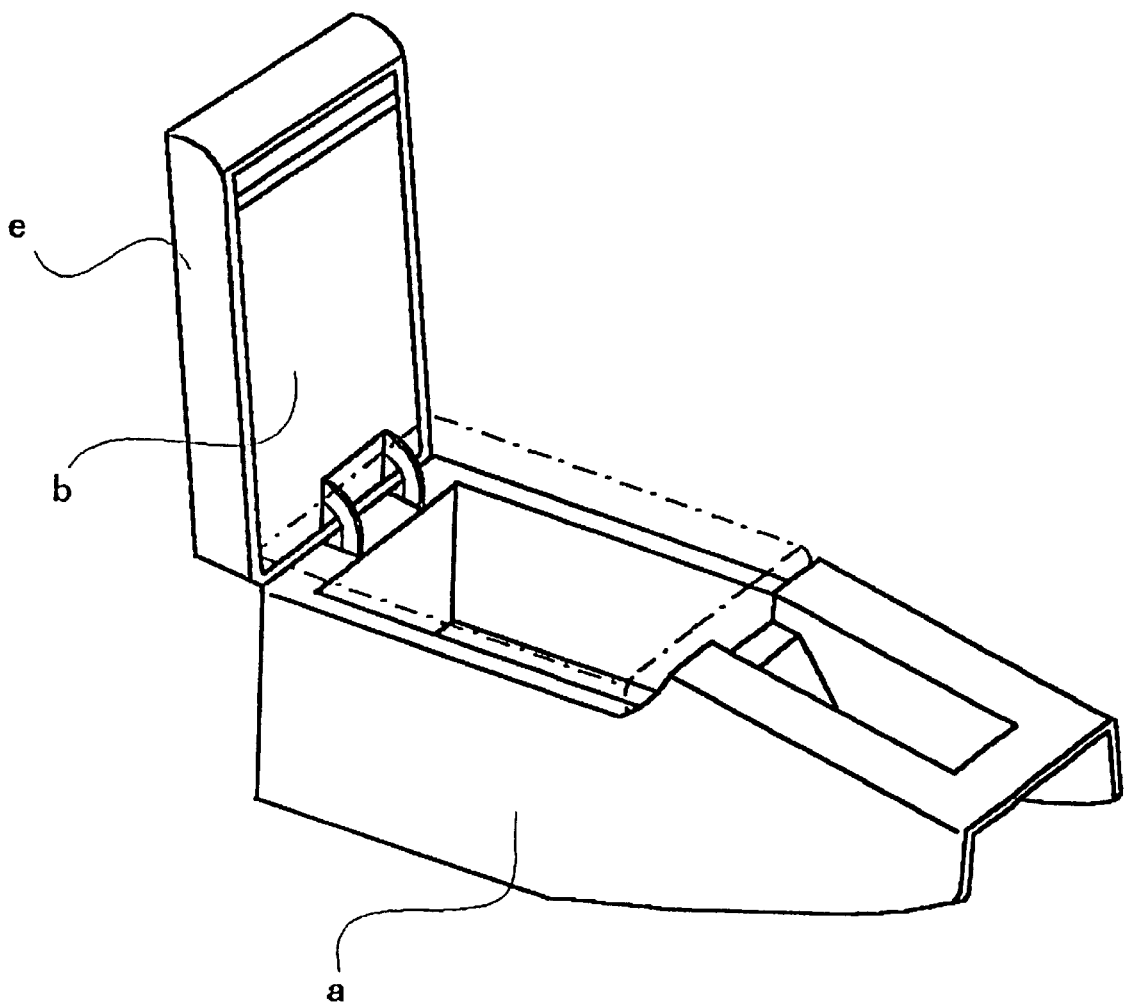
FIG. 13 is a perspective view showing one example of a center console box incorporating a pop-up unit.
Figure 14:
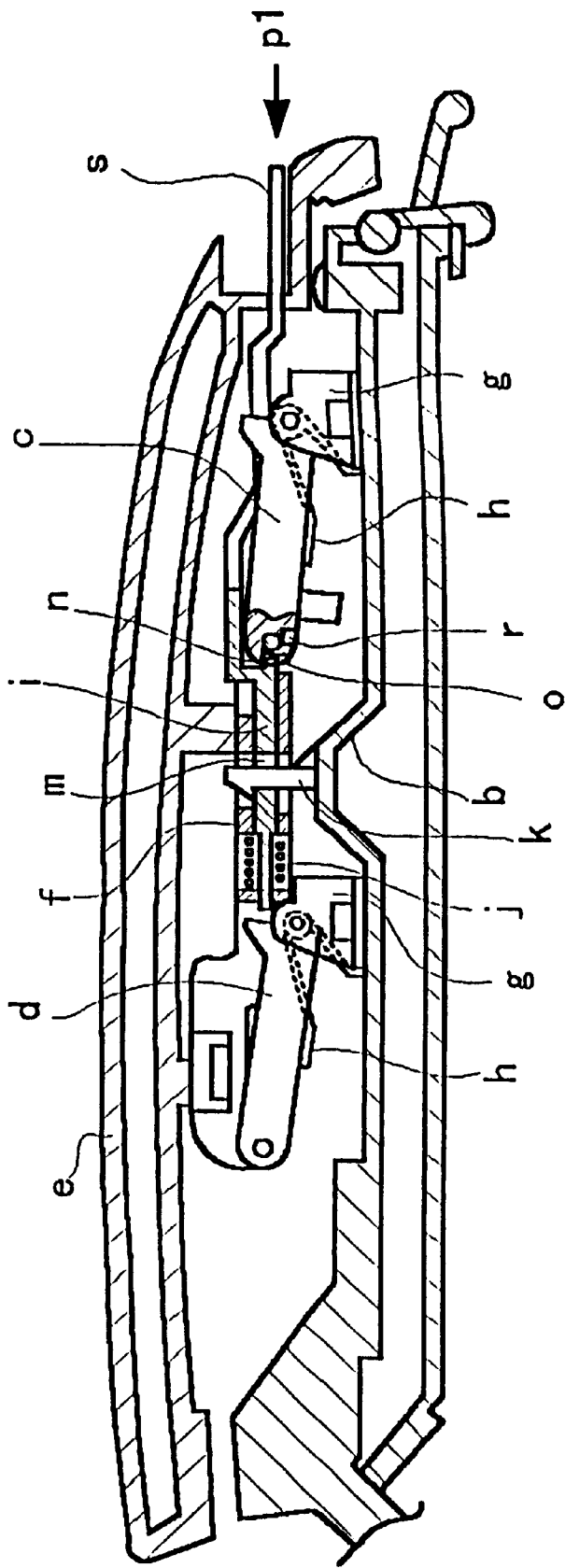
FIG. 14 is a side view with a partial section showing a conventional pop-up mechanism when folded.
Figure 15:
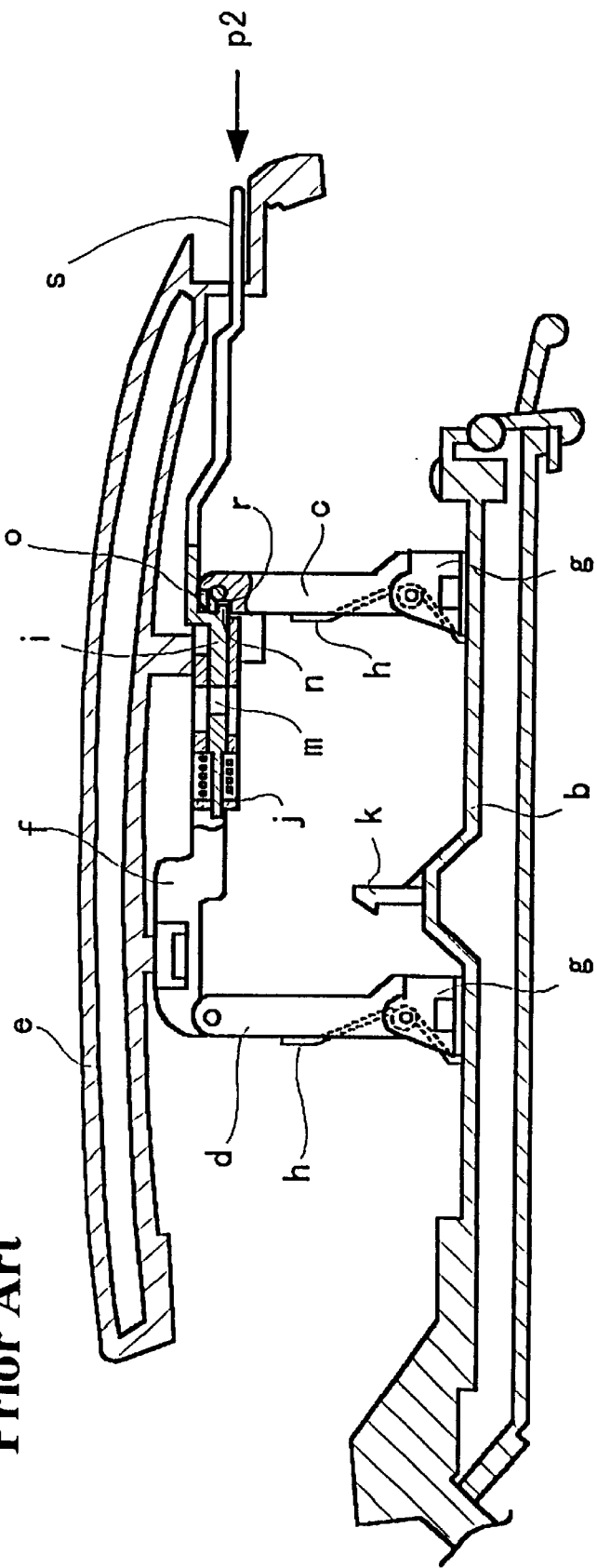
FIG. 15 is a side view with a partial section showing the pop-up state of the same convention pop-up mechanism.
Figure 16A:
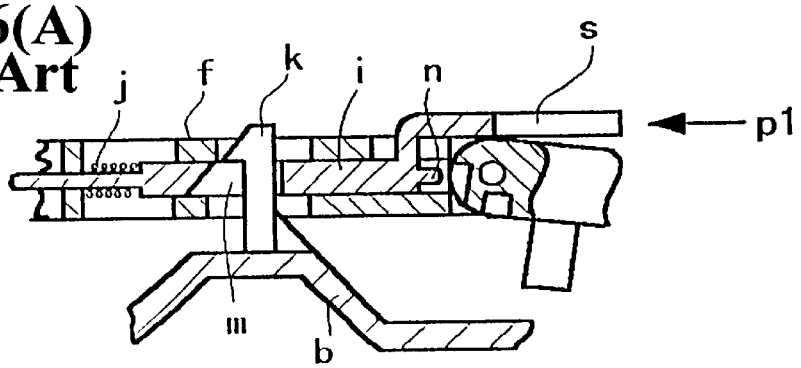
FIG. 16 is an enlarged sectional view for explaining the locking operation of the same conventional pop-up mechanism.
Figure 16B:
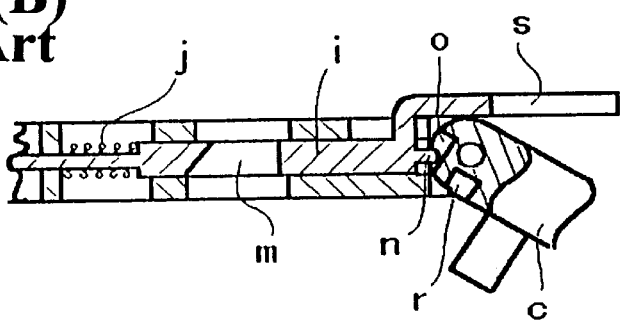
Figure 16C:
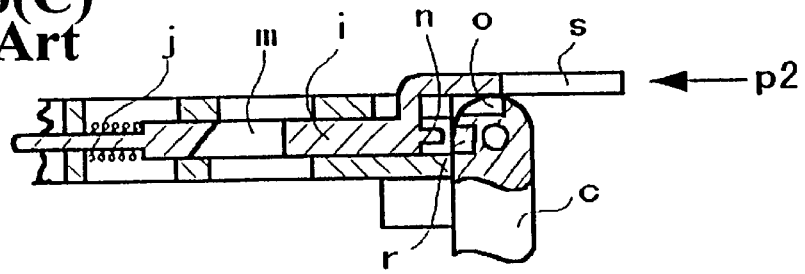
Figure 16D:
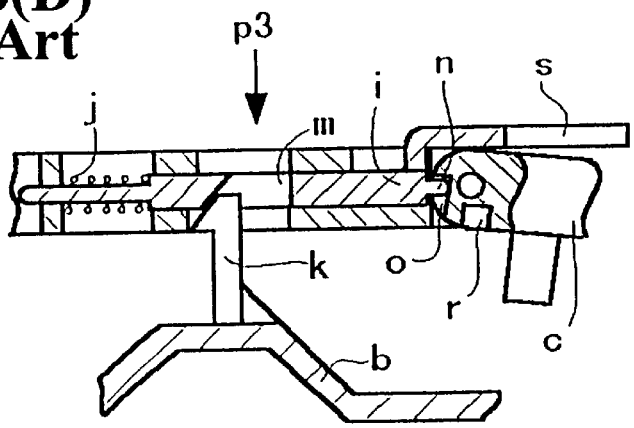

The pop-up unit in the present embodiment is incorporated between the cover (b) of the center console box (a), shown in FIG. 13, and the arm rest (e), as discussed above. That is, it is incorporated between the cover (b) and the arm rest (e) by the base body 1 fixed on the cover (b) and the arm rest (e) attached on top of the above ascending and descending body 3. At this time, the front end part of the above lock piece 4 projects outside from the front end surface of the arm rest (e) such that an operating button, and the like, is attached.

Figure 1:
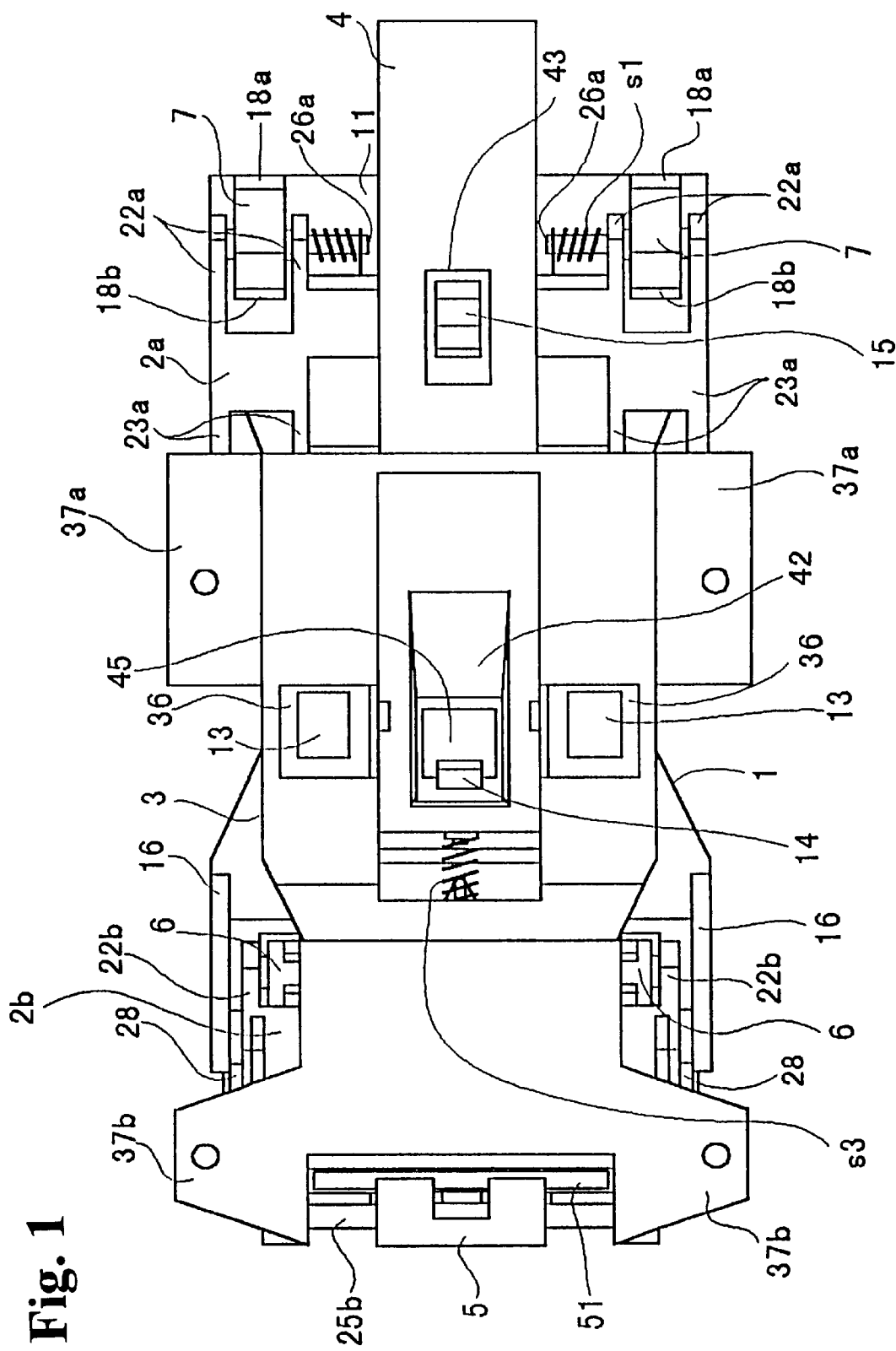
FIG. 1 is a plan view showing a pop-up unit using a pop-up mechanism pertaining to one embodiment of the present invention when folded.

Also, ordinarily, as shown in FIGS. 1, 2 and 3, the lock claw 14a of the above first lock stud 14 is coupled and locked into the lock hole 45 provided on the sack-shaped cavity 42 of the above lock piece 4 in a state where both flip-flop members 2a, 2b are turned down on the base body 1 in opposition to the force of the torsion springs s1, s2.

Figure 8A:
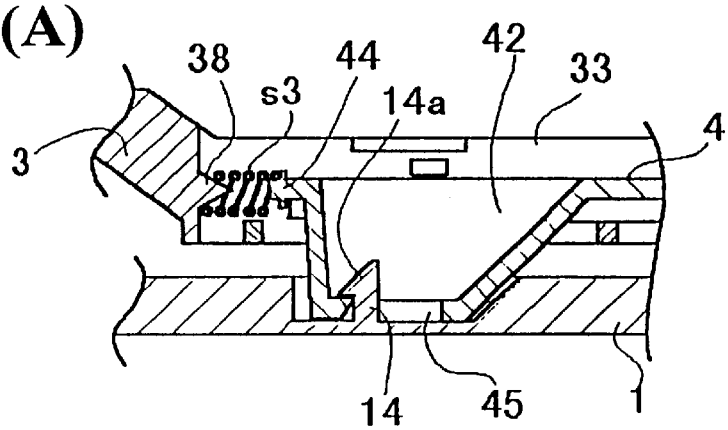
Figure 8B:
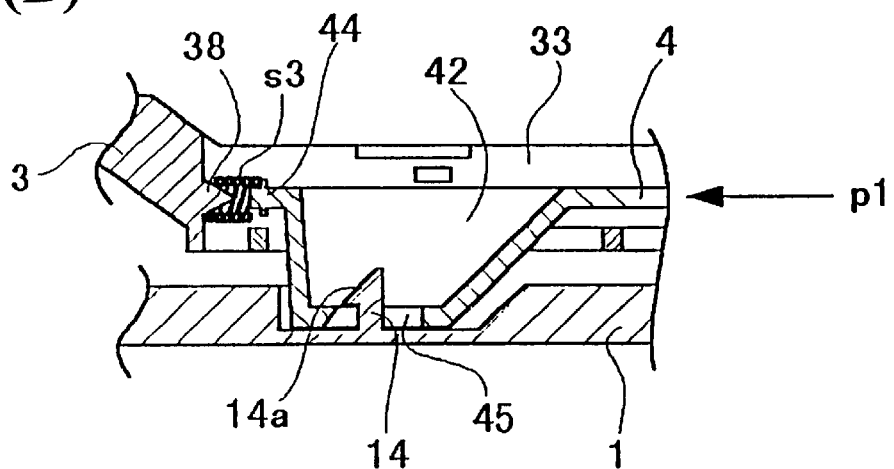

When the ascending and descending body 3 is raised from this state to be used as an arm rest, the above lock piece 4 is pressed along p1. Thus, from the state shown in FIG. 8(A) where the lock claw 14a of the above first lock stud 14 is coupled into the lock hole 45 provided on the sack-shaped cavity 42 of the above lock piece 4, as shown in FIG. 8(B), the lock piece 4 is slid backward (left side in the drawing) in opposition to the force of the coil spring s3, so that the coupling state of the above lock hole 45 of the lock piece 4 and lock claw 14a of the above lock stud 14 is released, and the locked state is released. By this, the above two flip-flop members 2a, 2b are rotated forward by the force of the torsion springs s1, s2, and the ascending and descending body 3 is raised and moves forward by the operation of the link mechanism.

Figure 5:
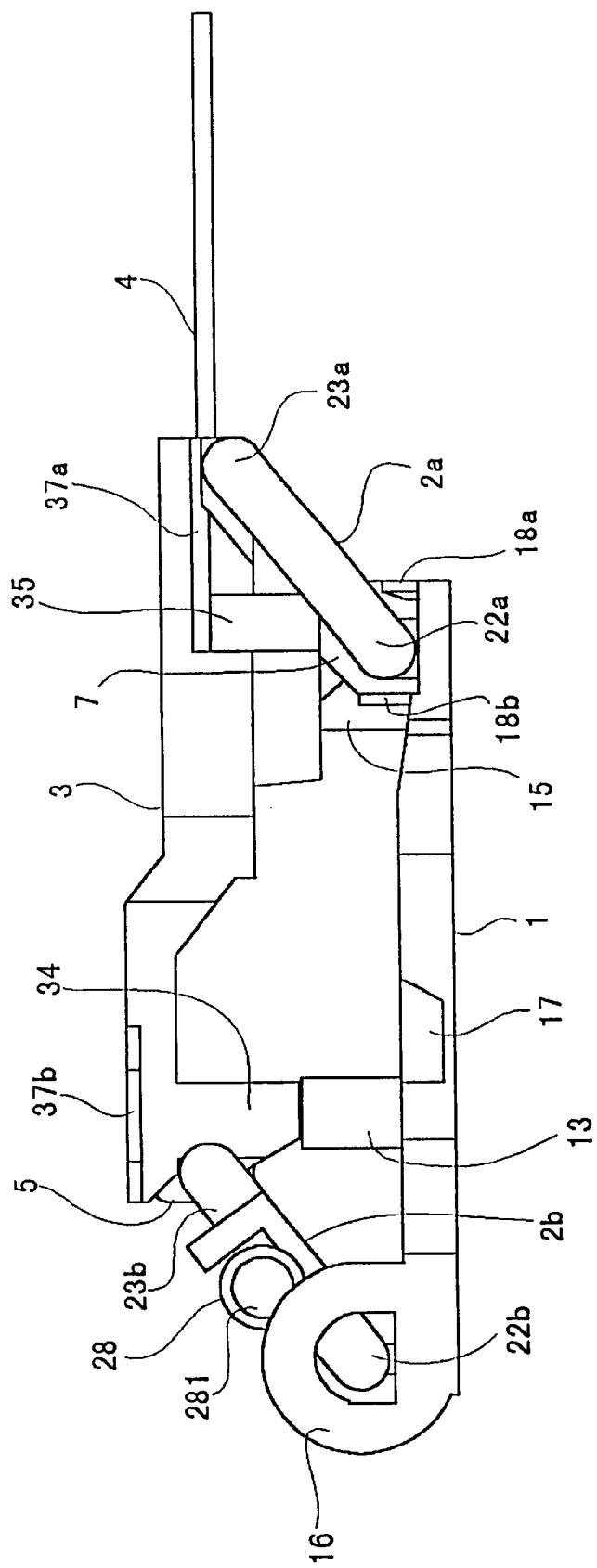
FIG. 5 is a side view showing the same pop-up unit when popped up.
Figure 9A:
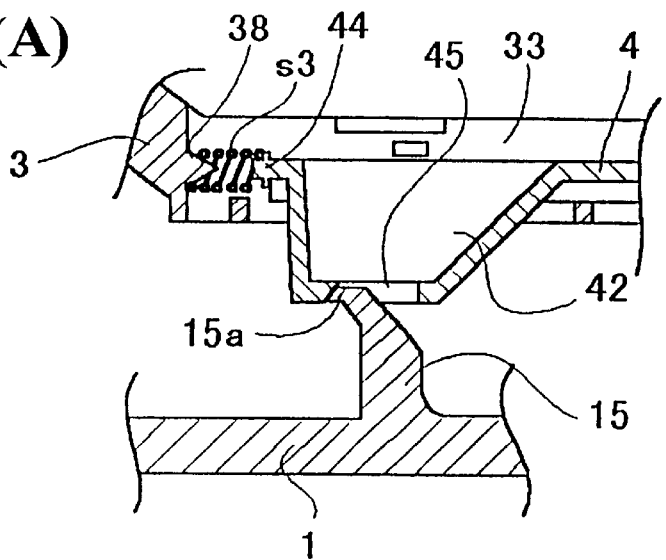
Figure 9B:
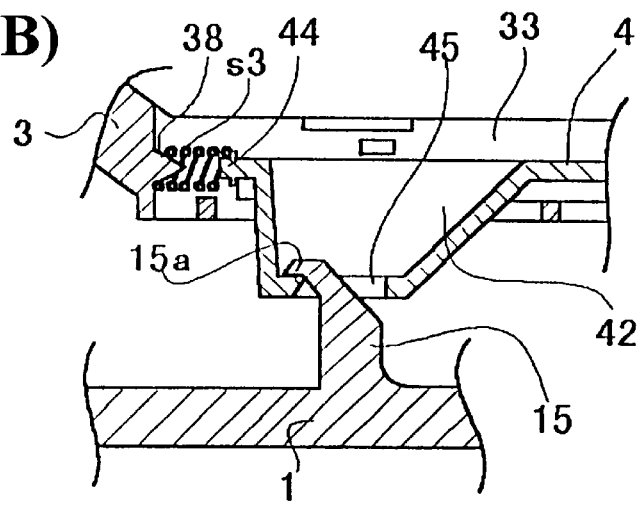
Figure 9C:
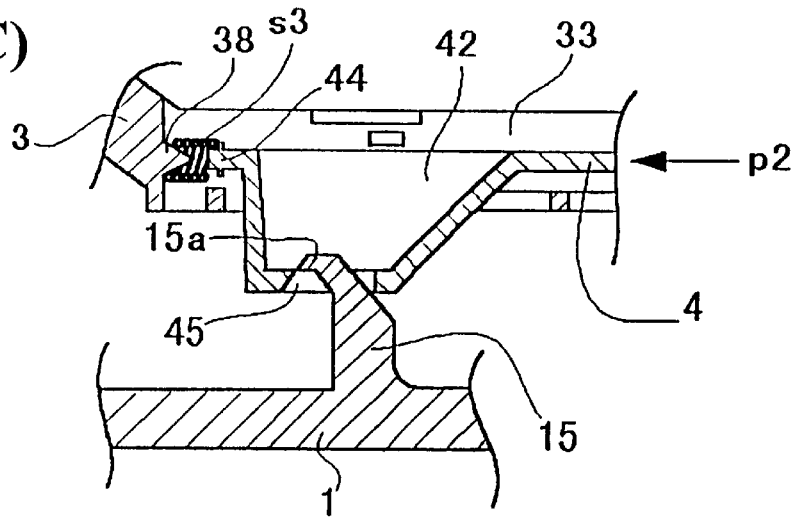

Also, when both flip-flop members 2a, 2b are rotated up to a specified angular degree, as shown in FIGS. 5 and 6, the upper surfaces of the strut 13 and strut 7 projecting upward on the upper surface of the base body 1 and the lower surfaces of struts 34, 35 projecting downward from the lower surface of the ascending and descending body meet each other, so that the rotational movement of both flip-flop members 2a, 2b is checked, and it becomes the pop-up state shown in FIGS. 4–6. At this time, as shown in FIG. 9(A), the lock hole 45 of the above lock piece 4 attached to the ascending and descending body 3 meets the tapered surface provided on the tip of the second lock stud 15 projecting upward on the base body 1 with the tapered surface provided on its inside edge part. As the ascending and descending body 3 is further lowered by the force of the torsion springs s1, s2 and the load on the ascending and descending body, the lock piece 4 is slid backward by the operation of the above two tapered surfaces, and it is again moved forward by the force of the coil spring s3. Thus, as shown in FIG. 9(B), the lock claw 15a of the second lock stud 15 couples into the lock hole 45 of the lock piece 4, and the ascending and descending body 3 is locked in the pop-up state discussed above.

The rotational movement of the both flip-flop members 2a, 2b due to the force of the above torsion springs s1, s2 in this pop-up operation is such that, by moving the flip-flop members 2a, 2b while the pinion gears 28a of the above dampers 28 engage the rack gears 16 placed upright on the rear end part of the base body 1 to rotate in linkage with the rotational movement of the rear flip-flop member 2b, the rotational speed of the flip-flop members 2a, 2b is decelerated by the above oil dampers 28. Thus, the two flip-flop members 2a, 2b rotate slowly, and the pop-up movement of the ascending and descending body 3 is performed slowly.

Thus, when the ascending and descending body 3 is popped up to be used as an arm rest, in the pop-up unit of the present embodiment, substantially all of the load on the ascending and descending body 3 in the pop-up state is supported by the struts 13, 7 on the side of the base body 1 and the struts 34, 35 of the ascending and descending body 3 meeting each other. There is no great load on the two flip-flop members 2a, 2b and the coupling part of the lock stud 15 and lock piece 4, and the like. Accordingly, substantially all of the load on the ascending and descending body 3 comes to be supported by the struts 13, 7, 34, 35 having very high strength, and even when there is a great load, it does not damage the unit, and it is extremely superior in loadbearing capability.

Furthermore, when the ascending and descending body 3 is lowered from the pop-up state shown in these FIGS. 4–6 to be returned to the folded state in FIGS. 1–3, the above lock piece 4 is again pressed along p2 as shown in FIG. 6, so that the above lock piece 4 is slid backward (left side in the drawing) in opposition to the force of the coil spring s3. By this, the sack-shaped cavity 42 provided on the lock piece 4 moves backward, so that the coupling state of the lock hole 45 formed in the sack-shaped cavity 42 and lock claw 15a of the second lock stud 15 placed to project upward on the base body 1 is released, and the locked state in the pop-up state is released. In this state, both flip-flop members 2a, 2b are moved backward in opposition to the force of the torsion springs s1, s2 so as to move the above ascending and descending body 3 backward, and the two flip-flop members 2a, 2b are turned down backward and the ascending and descending body 3 is pushed down while moving backward.

Figure 8C:
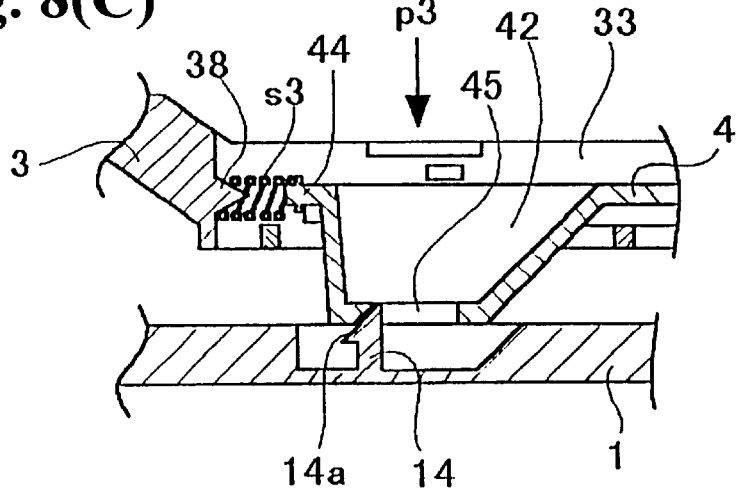

As shown in FIG. 8(C), as the above pressing force p2 is released, the tapered part on the tip of first lock stud 14 on the above base body 1 meets the tapered part formed on the inner periphery on the rear end side of the lock hole 45 of the lock piece 4 which had been moved forward (right side in the drawing). In this state, again the ascending and descending body 3 is pressed as shown in p3 to be pushed down further, so that the lock piece 4 is slid backward by the operation of the above two tapered parts, upon which the tip of the first lock stud 14 is inserted inside lock hole 45, and the lock piece 4 is again slid forward by the force of the coil spring s3. Then, as shown in FIG. 8(A), the lock claw 14a of the lock stud 14 and the lock hole 45 of the lock piece 4 are coupled, and they are locked in the folded state shown in FIGS. 1–3.

Figure 10A:
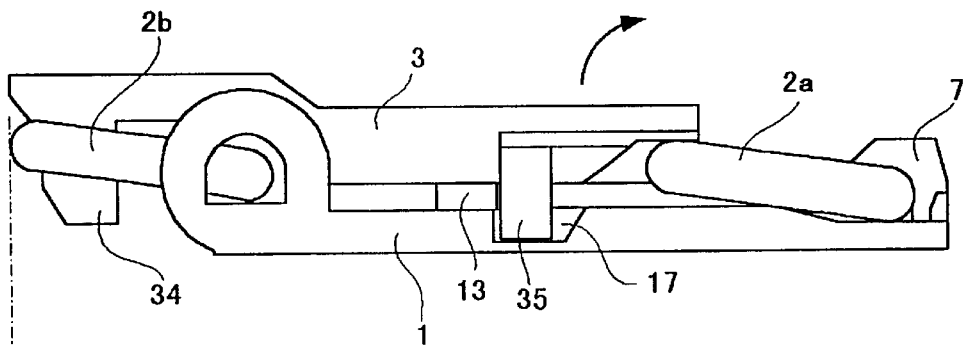
Figure 10B:
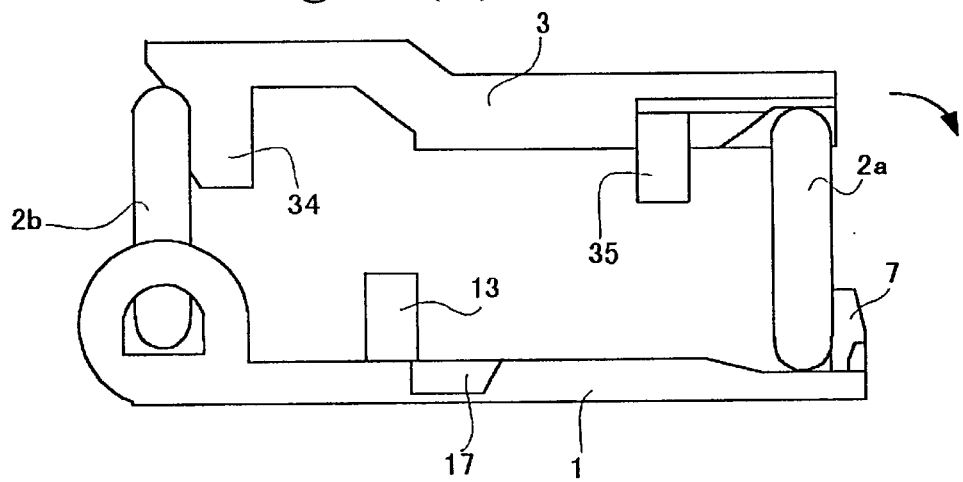
Figure 10C:
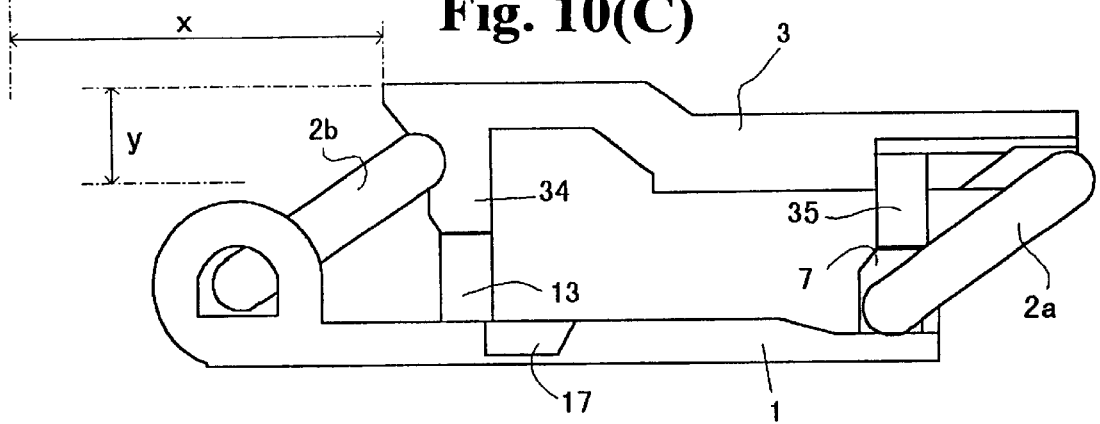

The operations of the ascending and descending body 3 and both flip-flop members 2a, 2b when moving to the pop-up state from the above folded state and again moving to the folded state are as shown consecutively in FIG. 10(A)–10(C). That is, when the locked state is released from the folded state in FIG. 10(A), both flip-flop members 2a, 2b which were turned down on the base body 1 stand up while being rotated forward by the force of the torsion springs s1, s2, and concomitant with this, the ascending and descending body 3 is raised while being moved forward. The two flip-flop members 2a, 2b stand upright when the ascending and descending body 3 reaches the highest point as shown in FIG. 10(B), and the two flip-flop members 2a, 2b are further rotated forward by the force of the above torsion springs s1, s2 such that the ascending and descending body 3 is moved forward past the highest point while being lowered. At the point, when both flip-flop members 2a, 2b are rotated up to a specified angular degree and the ascending and descending body is lowered to a specified position, as shown in FIG. 10(C), the struts 34, 35 projecting downward on the lower surface of the ascending and descending body 3 meet the struts 13, 7 projecting upward on the base body 1. Thus, the rotational movements of both flip-flop members 2a, 2b are stopped and the downward-forward movement of the ascending and descending body is stopped such that they are locked in this state to become the pop-up state in which the ascending and descending body 3 is raised to a specified height y and is advanced forward by x.

Also, when it is returned again to the folded state from this state, the locked state is released as discussed above in the state shown in FIG. 10(C) and the ascending and descending body 3 is moved backward. Thus, both flip-flop members 2a, 2b are rotated backward in opposition to the force of the above torsion springs s1, s2. By this, the ascending and descending body 3 is raised while being moved backward, upon which it comes to a state where both flip-flop members 2a, 2b are standing upright such that the ascending and descending body 3 has reached the highest point as shown in FIG. 10(B). Again, the ascending and descending body 3 is moved further backward such that the both flip-flop members 2a, 2b are rotated backward, whereby the ascending and descending body 3 is moved backward while being lowered passing through the highest point. Thus, it becomes the folded state as shown in FIG. 10(A), where both flip-flop members 2a, 2b are substantially turned down on the base body 1, such that the ascending and descending body has reached the lowest point, and it is locked in this state as discussed above.

As shown in FIGS. 10(A)–10(C), the pop-up mechanism of the present embodiment becomes in the pop-up state at a position where both flip-flop members 2a, 2b were rotated forward past the upright angle raising the above ascending and descending body 3 to the highest point, and when the ascending and descending body 3 having been raised to the highest point was lowered to a specified height.

Thus, in the pop-up mechanism of the present embodiment, the flip-flop members 2a, 2b provided so as to be capable of rotation on the above base body 1 are rotated by the force of the above torsion springs s1, s2 from a state where they are turned down, and the ascending and descending body 3 attached so as to be capable of rotation to the other end part of these flip-flop members 2a, 2b is raised and lowered by the link mechanism. Thus, the flip-flop members 2a, 2b are rotated to a specified angle such that the ascending and descending body is raised to a specified position, in which the struts 13, 7, 34, 35 provided on the base body 1 and the ascending and descending body 3 meet each other and the rotation of the flip-flop members 2a, 2b is checked or prevented in the position against the force of the above torsion springs s1, s2. The pop-up state where the ascending and descending body 3 is raised to the specified position is held, and furthermore, this state is locked.

Accordingly, the angular degree of rotation of the flip-flop members 2a, 2b can be set arbitrarily by arbitrarily setting the height and position of the above struts 13, 7, 34, 35, whereby range of raising y and range of forward-backward movement x of the ascending and descending body 3 when popped up can be set separately. Moreover, because the load on the ascending and descending body 3 is supported by the above struts 13, 7, 34, 35, which are completely rigid bodies fixed to the base body 1 and the ascending and descending body 3, it is vastly superior in load-bearing capability as compared to the conventional pop-up mechanism where the load is supported by the flip-flop members provided so as to be capable of rotation between the base body 1 and the ascending and descending body 3. Accordingly, with this pop-up mechanism, when it is used as a pop-up mechanism of the arm rest (e) disposed on the cover (b) of the center console box (a) of an automobile, the arm rest can be raised such that the optimum pop-up state is obtained by separately setting the range of raising y and the range of forward-backward movement x of the ascending and descending body (in this example, the range of raising y was set shorter, and the range of the forward-backward movement x was set greater) according to the vehicle type.

In this case, the pop-up unit of the above embodiment was constituted with the struts 7 provided on the base body 1 as a removable strut member. However, the other struts may be attached to and removed from the base body 1 and the ascending and descending body (3), and parts for attachment of the struts may be formed in a plurality of locations on the base body 1 and the ascending and descending body 3. Accordingly, it is possible to construct the pop-up units where only the struts are manufactured with different designs according to the vehicle type, and the optimum pop-up state is obtained according to the various vehicle types just by exchanging those struts. By this, there is no need to modify the designs of the components other than the struts according to the vehicle type, and it is possible to reduce the cost through making the components common.

Also, as noted above, because the load on the ascending and descending body 3 is supported by the above struts 13, 7, 34, 35 and the load on the ascending and descending body 3 is not transferred to the flip-flop members 2a, 2b, great strength is not required for the rotation shafts 24a, 24b, 25a, 25b linking the flip-flop members 2a, 2b and the base body 1 as well as the ascending and descending body 3. Accordingly, such rotation shafts can be formed integrally with the flip-flop members 2a, 2b using synthetic resin, and it is possible to reduce the weight and cost, and the assembly operation is improved as compared with the conventional pop-up mechanism where it was necessary to use a metal shaft as this rotating shaft.

Furthermore, because the load on the ascending and descending body 3 is supported by the above struts 13, 7, 34, 35, there is no great load on the lock mechanism for maintaining the pop-up state, and it is sufficient that the lock mechanism for maintaining the pop-up state be a simple mechanism consisting of the second lock stud 15 and the lock piece 4. Also, the pop-up state can be maintained by making the struts 13, 7 of the base body 1 and the struts 34, 35 of the ascending and descending body 3 to meet each other, whereby the rotation of the flip-flop members 2a, 2b is checked by the force of the above torsion springs s1, s2. Thus, it is possible to maintain a good pop-up state by the force of the torsion springs s1, s2, and according to a case, it is also possible to omit a lock mechanism for maintaining the pop-up state by omitting the second lock stud 15. Accordingly, from this point as well, it is possible to design for reduction of weight, curtailment of cost, and improvement of assembly operation.

The pop-up mechanism of the present invention is not limited to the above embodiment, and it can be modified variously in the scope of the essential points. For example, in the above embodiment, the pop-up unit was constituted such that base body 1 was fixed to the cover (b) of the center console box (a) and the arm rest (e) was attached to the ascending and descending body 3. However, it is also possible to constitute the cover (b) of the center console box (a) as the base body 1 and to constitute the ascending and descending body 3 as the arm rest (e). Also, the means for performing locking/unlocking in the folded state and pop-up state also can be suitably modified without being limited to those using the lock piece 4 and the lock studs 14, 15 in the above embodiment. In this case, a lock mechanism for locking in the pop-up state also can be omitted as discussed above. Furthermore, the damper as well may be made different from that in the above embodiment, and according to the situation, it also may be omitted.

Figure 12B:
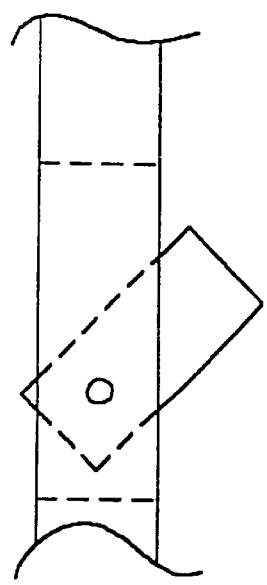
Figure 12C:
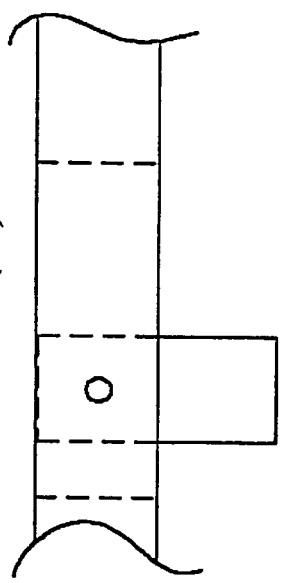
Figure 11:
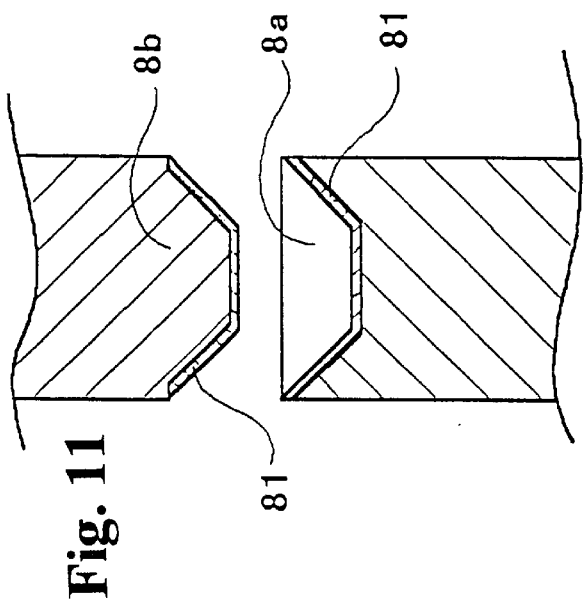
FIG. 11 is a sectional view showing an example of improvement of struts constituting a pop-up mechanism of the present invention.
Figure 12A:
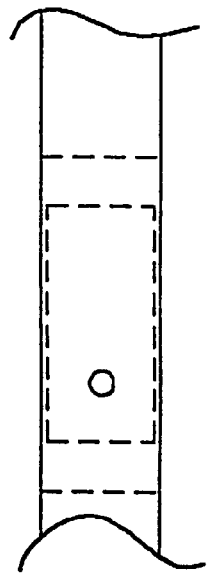

Also, the above embodiment was made such that the struts 13, 7, 34, 35 were provided on both base body 1 and the ascending and descending body 3, but the struts also may be provided on only one of the base body 1 or the ascending and descending body 3. Furthermore, the above embodiment was constituted such that the upper surfaces of the struts 13, 7 on the side of the base body 1 and the lower surfaces of the struts 34, 35 on the side of the ascending and descending body 3 are simply made to meet each other, but as shown in FIG. 11, the occurrence of shakiness in the ascending and descending body 3 when popped up can be effectively prevented by making the tips of the struts meeting each other to couple with each other as a groove 8a and a tongue 8b. Also, elastic materials 81 of rubbery material, and the like, may be disposed on the tips of both struts meeting each other so as to absorb the shock when meeting. Furthermore again, the above embodiment, as shown in FIGS. 1 and 2, is constituted such that the strut 13 on the side of the base body 1 is inserted into the square hole 36 of the ascending and descending body 3 when folded. However, as shown in FIGS. 12(A)–12(C), it also may be made such that the struts are provided so as to be capable of folding on the base body and the ascending and descending body such that the struts are folded inside the ascending and descending body during the folding of the unit and the struts are unfolded by self weight or a suitable forcing means during the pop-up state.

Furthermore, the pop-up mechanism of the present invention is well-suitably used as the ascending and descending apparatus constituted in the center console box of an automobile as in the above embodiment. However, the use of the pop-up mechanism of the present invention is not limited to this, and it can be well-suitably used as a mechanism for modifying the relative positional relationships between a base body and a component attached to that base body in all kinds of chairs and arm rests and things requiring modification of those relative positional relationships according to the manner of use.

With the pop-up mechanism of the present invention as explained above, superior load-bearing capability can be obtained, and the range of raising and range of forward-backward movement of the ascending and descending body can be set separately, and furthermore, it is possible to design for reduction of weight, curtailment of cost, and improvement of assembly operation.

What is claimed is:

1. A pop-up mechanism comprising:
    a base body,
    at least one pair of flip-flop members, each having one end rotatably linked to the base body and the other end opposite to said one end, said flip-flop members having a folded state where the flip-flop members are substantially located close to the base body and a pop-up state where the flip-flop members are turned upwardly,
    an ascending and descending member rotatably attached to the other ends of the flip-flop members,
    urging means attached to at least one of the flip-flop members for urging said one flip-flop member in the pop-up state,
    locking means for locking the flip-flop members in the folded state, and
    at least one strut immovably fixed on at least one of an upper surface of the base body and a lower surface of the ascending and descending member, said at least one strut having a predetermined height so that in the pop-up state, a tip of the strut abuts against one of portions formed immovably on the other of the upper surface of the base body and the lower surface of the ascending and descending member to stably hold and support the ascending and descending member in the pop-up state.

2. A pop-up mechanism according to claim 1, wherein said flip-flop members rotate relative to the base body to change a position between the folded state and the pop-up state, said flip-flop members moving from the folded state to the pop-up state passing through an upright position where the ascending and descending member is located at a highest position relative to the base body.

3. A pop-up mechanism according to claim 1, wherein said locking means includes a first engaging member attached to the base body, and a lock piece slidably attached to the ascending and descending member and having a second engaging member engaging the first engaging member in the folded state.

4. A pop-up mechanism according to claim 3, wherein said locking means further includes a third engaging member attached to the base body and engaging the second engaging member in the pop-up state.

5. A pop-up mechanism according to claim 1, wherein said at least one strut is exchangeably attached to one of the base body, and the ascending and descending member so that when said at least one strut is changed with a strut with a different height, a location of the ascending and descending member relative to the base body is changed.

6. A pop-up mechanism according to claim 1, wherein said at least one strut includes four lower strut members attached onto the base body, and four upper strut members immovably attached under the ascending and descending member, said upper and lower strut members abutting against each other in the pop-up state.

7. A pop-up mechanism according to claim 6, wherein each of said lower strut member includes one of a projection and a dent, and each of said upper strut member includes the other of the projection and the dent, said projection and dent engaging each other.

8. A pop-up mechanism according to claim 1, wherein in the pop-up state, the ascending and descending member is raised to a predetermined height away from the base body, and in the folded state, the ascending and descending member is located close to the base body.

9. A pop-up mechanism according to claim 1, wherein said flip-flop members are arranged to rotate from the folded state to the pop-up state passing through a position where the flip-flop members are oriented orthogonal to the base body.

10. A pop-up mechanism comprising:

a base body, at least one pair of flip-flop members, each having one end rotatably linked to the base body and the other end opposite to said one end, said flip-flop members having a folded state where the flip-flop members are substantially located close to the base body and a pop-up state where the flip-flop members are turned upwardly, an ascending and descending member rotatably attached to the other ends of the flip-flop members, urging means attached to at least one of the flip-flop members for urging said one flip-flop member in the pop-up state, locking means for locking the flip-flop members in the folded state including a first engaging member attached to the base body, a lock piece slidably attached to the ascending and descending member and having a second engaging member engaging the first engaging member in the folded state, and a third engaging member attached to the base body and engaging the second engaging member in the pop-up state, and at least one strut placed on at least one of an upper surface of the base body and a lower surface of the ascending and descending member, said at least one strut having a predetermined height so that in the pop-up state, a tip of the strut abuts against one of portions communicating with the upper surface of the base body and the lower surface of the ascending and descending member to hold the ascending and descending member in the pop-up state.

* * * * *